US008020477B2

(12) United States Patent
Aoyama

(10) Patent No.: US 8,020,477 B2
(45) Date of Patent: Sep. 20, 2011

(54) GUIDE FENCE FOR CUTTING MACHINE, AND CUTTING MACHINE HAVING SAME

(75) Inventor: Syuji Aoyama, Anjo (JP)

(73) Assignee: Makita Corporation, Anjo (JP)

( * ) Notice: Subject to any disclaimer, the term of this patent is extended or adjusted under 35 U.S.C. 154(b) by 510 days.

(21) Appl. No.: 12/230,599

(22) Filed: Sep. 2, 2008

(65) Prior Publication Data

US 2009/0071306 A1 Mar. 19, 2009

(30) Foreign Application Priority Data

Sep. 19, 2007 (JP) ................................ 2007-242879

(51) Int. Cl.
*B23D 15/04* (2006.01)
*B26D 5/08* (2006.01)

(52) U.S. Cl. .............. 83/490; 83/397; 83/471.3; 83/581

(58) Field of Classification Search .................... 83/397, 83/438, 454, 468.3, 468.7, 471.3, 473, 477.1, 83/581

See application file for complete search history.

(56) References Cited

U.S. PATENT DOCUMENTS

| | | | | |
|---|---|---|---|---|
| 5,819,623 | A | 10/1998 | Sasaki et al. | |
| 6,481,320 | B1 | 11/2002 | McGrory et al. | |
| 6,561,068 | B2 * | 5/2003 | Meredith et al. | 83/471.3 |
| 6,606,931 | B1 * | 8/2003 | Brunson et al. | 83/471.3 |
| 2004/0154450 | A1 * | 8/2004 | Vallone | 83/581 |
| 2006/0230901 | A1 * | 10/2006 | Figurski | 83/465 |

* cited by examiner

*Primary Examiner* — Ghassem Alie
(74) *Attorney, Agent, or Firm* — Oliff & Berridge, PLC

(57) ABSTRACT

A cutting machine includes a main body in which a rotary blade is included, a base over which a workpiece is to be placed, and a guide fence mountable to the base. The main body is provided above the base in such a manner that the main body is movable upward and downward, and a longitudinal direction of the guide fence is perpendicular to the rotary blade as viewed from top when the guide fence is mounted to the base. The guide fence provides a guide surface that extends in the longitudinal direction of the guide fence and is configured to be rendered perpendicular to a top face of the base when the guide fence is mounted to the base. The guide fence includes a stopper that is configured to project from the guide surface, to be movable upward and downward, and to be fixed at any level.

17 Claims, 3 Drawing Sheets

GUIDE FENCE FOR CUTTING MACHINE, AND CUTTING MACHINE HAVING SAME

This application claims the entire benefit of Japanese Patent Application Number 2007-242879 filed on Sep. 19, 2007, the entirety of which is incorporated by reference.

BACKGROUND OF THE INVENTION

1. Field of the Invention

This invention relates to a guide fence for a cutting machine, i.e., a guide fence provided in a cutting machine, such as a bench circular sawing machine, for use in positioning a workpiece on the cutting machine, and to a cutting machine in which such a guide fence is used.

2. Description of Related Art

In a bench circular sawing machine as one example of a cutting machine, its main body including a rotary blade is attached to an arm provided upright on a rear portion of a base, in such a manner that the main body is swingable upward and downward. By the downward swinging operation of the main body, the rotary blade is moved accordingly so as to cut a workpiece placed on the base. On the base is provided a guide fence extending laterally and having a guide surface vertical to a top face of the base so that a workpiece may be pressed against the guide surface, to facilitate positioning of the workpiece.

In cases where the workpiece to be cut is for crown moldings (decorative parts which are to be fitted to corners between a ceiling and an adjoining wall), however, the workpiece is rested in an unstably leaned position against the guide surface during cutting process. Therefore, even if the workpiece is pressed against the guide surface, the crown molding workpiece would become so shaky and unsettled that the workpiece could disadvantageously not be positioned adequately. With this in view, U.S. Pat. No. 6,481,320 B1 discloses an L-shaped holder capable of holding a crown molding workpiece in a leaned position with its upper and lower edges retained by rims of the holder. Thus, the holder with a crown molding workpiece held therein is pressed against the guide fence so as to make the workpiece positioned adequately.

On the other hand, the holder is an extra part to be provided in addition to the guide fence solely for crown molding workpieces, and thus requires additional manufacturing costs and managerial tasks. Moreover, crown molding workpieces should be attached to and detached from the holder one by one for each cutting process, which may be considered to be burdensome and inconvenient.

SUMMARY OF THE INVENTION

It is an aspect of the present invention to provide a guide fence for a cutting machine, as well as a cutting machine having the same, with which a crown molding workpiece can be positioned easily in a stable manner without any additional part such as a holder, and which is excellent in cost-effectiveness and ease-of-use.

More specifically, in one aspect of the present invention, there is provided a guide fence for a cutting machine. The cutting machine has a base over which a workpiece is to be placed, and a main body including a rotary blade. The main body is provided above the base in such a manner that the main body is movable upward and downward, and a longitudinal direction of the guide fence is perpendicular to the rotary blade as viewed from top when the guide fence is mounted to the base. The guide fence comprises: a guide surface that extends in the longitudinal direction of the guide fence and is configured to be rendered perpendicular to a top face of the base when the guide fence is mounted to the base; and a stopper that is configured to project from the guide surface, to be movable upward and downward, and to be fixed at any level.

Particularly, in order not to impair the ease-of-use by providing the stopper in the guide fence, the stopper may preferably be configured to be manipulatable to move between a serviceable position in which the stopper projects from the guide surface and a retracted position in which the stopper is retracted from the guide surface.

In another aspect of the present invention, there is provided a cutting machine which comprises a base over which a workpiece is to be placed; a main body including a rotary blade, the main body being provided above the base in such a manner that the main body is movable upward and downward; and a guide fence having any of the inventive features of the present invention, which is mountable to the base.

According to the above aspects of the present invention, the stopper is provided in the guide fence; therefore, a crown molding workpiece can be positioned easily in a stable manner even not using of any additional part such as a holder. This increases the ease of use of the cutting machine, without increasing the costs.

In a particular embodiment where the stopper is configured to be manipulatable to move between a serviceable position in which the stopper projects from the guide surface and a retracted position in which the stopper is retracted from the guide surface, the stopper can be made serviceable on an as-needed basis. Therefore, when any workpiece other than crown molding workpieces is to be cut, the stopper can be retracted so as not to obstruct the cutting operation. Consequently, the provision of the stopper in the guide fence may not impair the operability of the cutting machine.

BRIEF DESCRIPTION OF THE DRAWINGS

The above aspects, other advantages and further features of the present invention will become more apparent by describing in detail illustrative, non-limiting embodiments thereof with reference to the accompanying drawings, in which.

DETAILED DESCRIPTION OF THE EXEMPLARY EMBODIMENTS

Exemplary embodiments of the present invention will be described hereinafter with reference to the accompanying drawings.

Figure 1:
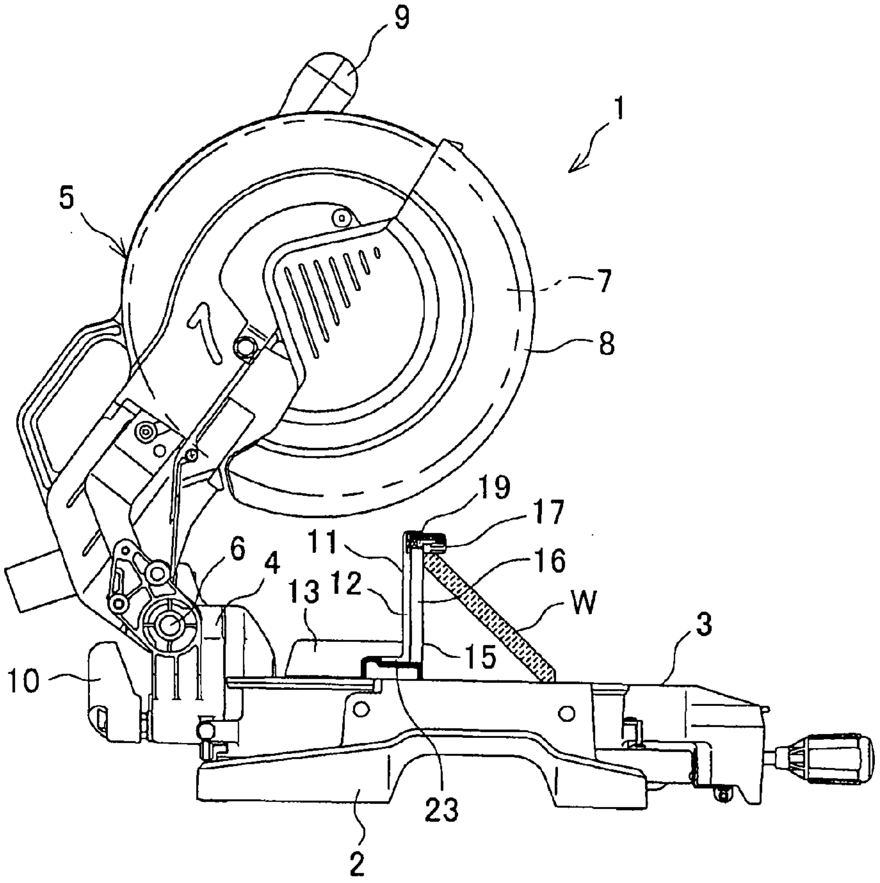
FIG. 1 is a side elevation of a bench circular sawing machine as one example of a cutting machine according to an exemplary embodiment of the present invention.

Referring now to FIG. 1, a bench circular sawing machine 1 comprises a base 2, a round turntable 3 placed over the base 2 in such a manner that the turntable 3 can be horizontally rotated substantially at a center of the base 2, a joint part 4 rotatably provided at a middle position of a rear side (left side in FIG. 1) of the turntable 3, and a main body 5 of which a lower end is connected to an upper end of the joint part 4 by a pivot 6 in such a manner that the main body 5 can be swung upward and downward around the pivot 6. The main body 5 includes a disk-like saw blade 7 as one example of a rotary blade which is configured to be rotated by a motor (not shown) provided at a side of the main body 5, and the saw blade 7 is disposed in a front/rear direction. The main body 5 is always biased upward by a torsion spring (not shown) provided on the pivot 6 and thus normally retained in an upper limit position as shown in FIG. 1. Denoted by reference numeral 8 is a safety cover which is configured to cover the saw blade 7 when the main body 5 is in the upper limit position and to turn in such a direction as to reveal the saw blade when the main body is moved downward. Denoted by reference numeral 9 is a handle. The joint part 4 is configured to be movable to the right or to the left and fixed at any angle relative to the turntable 3 by means of a lever 10.

Figure 2:
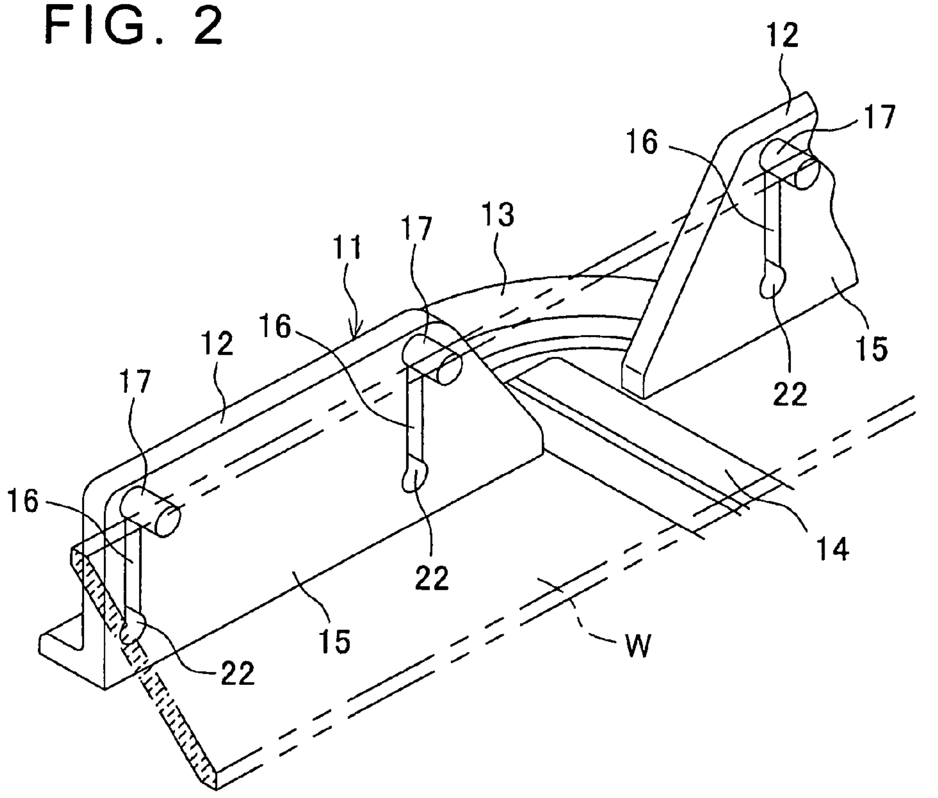
FIG. 2 is a perspective view of a guide fence according to an exemplary embodiment of the present invention.

A guide fence 11 as one example of a guide fence for a cutting machine according to an exemplary embodiment of the present invention is provided laterally on the base 2 and fixed thereto by bolts, in such a manner that the guide fence 11 is disposed laterally to cross over the turntable 3 and perpendicularly to the saw blade 7 as viewed from top, so as not to come in contact with the turntable 3. The guide fence 11 includes, as shown in FIG. 2, a pair of left and right L-shaped guide parts 12, a semicircular roundabout part 13 which diverts around a blade edge plate 14 provided in a center of the turntable 3 and by which the left and right guide parts 12 are connected. At a front face of each guide part 12 is provided a guide surface 15 which is perpendicular to a top face of the turntable 3.

Figure 3A:
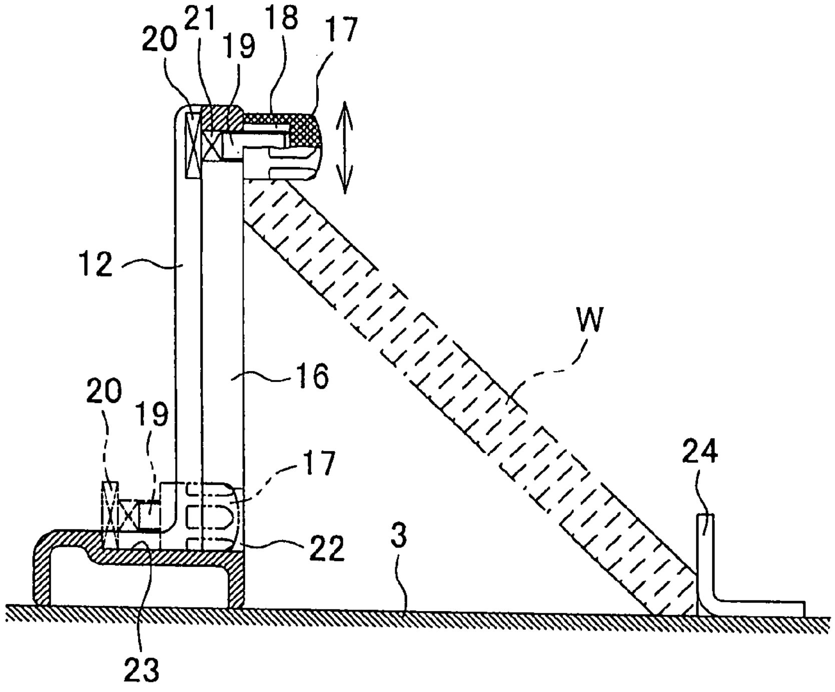
FIGS. 3A to 3C are explanatory illustrations of the guide fence, of which a section taken along a slit is shown in 3A, a portion around a knob as viewed from a rear side is shown in 3B, and the slit and the knob as viewed from a front side are shown in 3C.
Figure 3B:
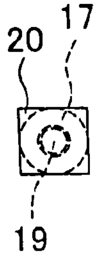
Figure 3C:
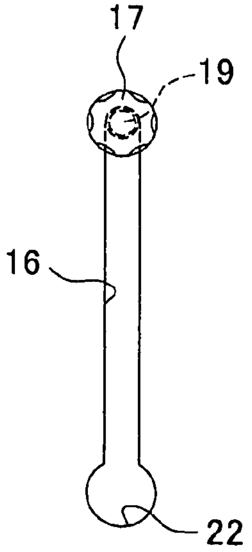

A pair of slits 16 is vertically provided at left and right regions of each guide part 12, and a knob 17 as an example of a stopper is mounted to each slit 16. The knob 17 is, as shown in FIGS. 3A to 3C, made of rubber, and has a hollow on a rear side thereof with a nut 18 provided inside. A screw bolt 19 having a retaining plate 20 provided at a rear end thereof is inserted through the slit 16 from the rear side of the guide part 12 and the nut 18 is screwed on the screw bolt 19, so that the knob 17 is movable vertically along the slit 16. A prismatic shaft portion 21 having a width which conforms to that of the slit 16 is provided in a base portion of the screw bolt 19, which is between an underhead portion and a threaded portion thereof, so that the screw bolt 19 is restrained from turning in the slit 16. Accordingly, when the knob 17 positioned in a predetermined position within the slit 16 is manipulated to turn in a screw-in direction, the knob 17 and the retaining plate 20 of the screw bolt 19 come closer to each other so that the knob 17 and the retaining plate 20 hold the guide part 12 from the front and from the rear, respectively, whereby the knob 17 is fixed at that predetermined position.

At a lower end of each slit 16 in each guide part 12, a perforation 22 is formed contiguous with the slit 16, so as to allow the knob 17 to fit in. On the other hand, at a rear side of the perforation 22, a recess 23 is formed contiguous with the perforation 22, so as to allow the retaining plate 20 to slide rearward. Accordingly, when the knob 17 is positioned to fit in the perforation 22 and pushed in rearward, the knob 17 can be moved back into a retracted position in which the knob 17 is retracted to a position rearward of the guide surface 15, as indicated by chain double-dashed lines in FIG. 3A. When the retaining plate 20 of the screw bolt 19 fitted in the nut 18 in the knob 17 at the retracted position is pushed frontward, the knob 17 comes out of the perforation 22 and moves to a serviceable position in which the knob 17 projects frontward from the guide surface 15. It is to be understood that the knob 17 in the retracted position is in contact with an inner surface of the perforation 22, and thus can be prevented from coming off by a friction force of rubber. As a result, there is no fear that the knob 17 might accidentally come out into the serviceable position.

With the bench circular sawing machine 1 configured as described above, when a crown molding workpiece W is to be cut, each knob 17 is turned and loosened, then slid up to the upper end of the slit 16, and screwed in so as not to fall down. Next, the crown molding workpiece W is rested against the guide fence 11 as shown in FIG. 3A with its lower edge placed in contact with a position spaced from the guide fence 11 on the top face of the turntable 3 and its upper edge placed in contact with an upper position on the guide surface 15 of the guide fence 11. Subsequently, each knob 17 is lowered to a position in which the knob 17 comes in contact with the upper edge of the crown molding workpiece W, and is screwed in and fixed tightly in that position. Then, the upper edge of the crown molding workpiece W is held down by the knobs 17 at several spots, so that the leaned position of the crown molding workpiece W is retained. In an exemplary embodiment where a positioning part 24 which is configured to be movable horizontally relative to the guide fence 11 and to be fixed at any position is provided on the base 2, the positioning part 24 is brought into contact with the lower edge of the crown molding workpiece W from the front side, and fixed in position.

With this crown molding workpiece W positioned in this way, when a switch (not shown) provided in the handle 9 is turned on, the motor is driven to rotate the saw blade 7. During the rotation of the saw blade, when the main body 5 is moved downward by means of the handle 9, the crown molding workpiece W is cut at right angles with the guide fence 11. Since the crown molding workpiece W is held down at its upper edge, it is unlikely that the crown molding workpiece W will rattle or bounce during its cutting operation. As a result, the cutting operation can be carried out precisely with the crown molding workpiece W held in a desired cutting position without fail. The turntable 3 may be turned to perform a miter cut for cutting a workpiece with the saw blade 7 swiveled horizontally and set at an angle shifted with respect to a front/rear direction. On the other hand, the main body 5 may be tilted by means of the lever 10 to perform a bevel cut for cutting a workpiece with the saw blade 7 tilted sideways and set at an angle shifted with respect to a vertical direction. After completion of the cutting operation, the knobs 17 may be loosened to release the holding force applied by the knobs 17 to the crown molding workpiece W.

In contrast, when a workpiece to be cut has a rectangular cross section, each knob 17 is moved down to the perforation 22 at the lower end of the slit 16, and then pushed rearward, so that the knob 17 is moved back to the retracted position in which the knob 17 is retracted from the guide surface 15. Thus, the workpiece can be appropriately positioned by usual press operation against the guide surface 15. Thereafter, when a crown molding workpiece W is to be cut again, the retaining plate 20 is pushed from rearward so that the knob 17 is caused to project from the perforation 22 frontward to the serviceable position. Then, the knob 17 is grasped to move the prismatic shaft portion 21 of the screw bolt 19 back into the slit 16 so that the knob 17 can be moved along the slit 16 and fixed at any level in such a way as described above.

As described above, with the guide fence 11 and the bench circular sawing machine 1 according to the aforementioned embodiments, the guide fence 11 is provided with knobs 17 configured to project from the guide surface 15, to be movable upward and downward, and to be fixed at any level. Therefore, a crown molding workpiece W can be easily positioned in a stable manner without any separate element such as a holder.

As a result, the operability of the cutting machine can be enhanced, at no additional cost.

In particular, the above embodiments provide the knobs 17 each of which is configured to be manipulatable arbitrarily to move between a serviceable position in which the knob 17 projects from the guide surface 15 and a retracted position in which the knob 17 is retracted from the guide surface 15, and thus each knob 17 can be made serviceable on an as-needed basis, and will never obstruct the cutting operation when a workpiece other than crown molding workpieces W is to be cut.

Some exemplary embodiments of the present invention have been described above. The present invention is not limited to these embodiments, and may be carried out into practice in various other ways. Thus, it is contemplated that various modifications and changes may be made to the exemplary embodiments of the invention without departing from the scope of the embodiments of the present invention as defined in the appended claims.

For example, the stopper consistent with the present invention may not necessarily be embodied by the knobs as described above, but may be embodied by any other constructions such as those in which hand screws are used, instead. Moreover, the stopper may not necessarily be configured to be fixed in position by a screw-in structure as described above, but any structure for making the stopper movable upward and downward and to be fixed at any level may be selected from alternative or modified methods known in the art; for example, in the guide parts, through holes may be provided which are arranged vertically on the guide surface at close or sparse intervals, and pins which may be provided in the stopper may be fitted into the through holes so that the stopper may be mounted at any of predetermined levels.

Furthermore, the retracted position of the stopper may not necessarily be at a lower-limit position of the movable range (e.g., lower end of the slit) of the stopper, but may be designed to be at some midpoint or an upper-limit position thereof, instead. It is to be understood that if the stopper is designed so as not to obstruct the cutting operation when a workpiece other than crown molding workpieces is to be cut, then the relevant structure for rendering the stopper movable to the retracted position can be dispensed with.

The present invention is also applicable to a slide circular saw having a mechanism for enabling a main body to slide frontward and rearward by means of a slide bar, a circular saw of a type without a turntable and/or without a bevel-cut mechanism, a cutter without cutting teeth, and other types of cutting machines.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A guide fence for a cutting machine, the cutting machine having a base over which a workpiece is to be placed, and a main body being provided above the base in such a manner that the main body is movable upward and downward, the main body including a rotary blade, the guide fence comprising:

- a guide surface perpendicular to a top face of the base when the guide fence is mounted to the base;
- a stopper projecting from the guide surface, to be movable upward and downward, and to be fixed at any position along a vertically extended slit in the guide surface; and
- a perforation contiguous with the vertically extended slit provided in the guide surface of the guide fence, the perforation being configured to allow the stopper to fit in the perforation, wherein
- a longitudinal direction of the guide fence is perpendicular to the rotary blade as viewed from top when the guide fence is mounted to the base.

2. The guide fence according to claim 1, wherein the stopper is configured to move between a serviceable position in which the stopper projects from the guide surface and a retracted position in which the stopper is retracted from the guide surface.

3. The guide fence according to claim 1, wherein the stopper is movable upward and downward along the vertically extending slit which is provided in the guide surface of the guide fence.

4. The guide fence according to claim 3, wherein the stopper is a knob having an aperture on a rear side thereof with a nut provided inside, and a screw bolt having a retaining plate provided at the rear end thereof, the screw bolt being configured to be inserted through the slit of the guide fence and screwed in the nut.

5. The guide fence according to claim 4, wherein the knob is made of rubber.

6. The guide fence according to claim 4, wherein the screw bolt comprises a prismatic shaft portion having a width which conforms to that of the slit, the prismatic shaft portion being provided between an underhead portion and a threaded portion of the screw bolt whereby the screw bolt is restrained from turning in the slit.

7. The guide fence according to claim 4, wherein the perforation is formed contiguous with the slit at a lower end of the slit, and a recess is formed at a rear side of the perforation so as to allow the retaining plate to slide rearward.

8. The guide fence according to claim 1, further comprising:

- left and right guide parts each of which have a surface that define the guide surface; and
- a semicircular roundabout part which bulges rearward and by which the left and right guide parts are connected,
- wherein the stopper projects from at least one of the left and right guide parts.

9. A cutting machine comprising:

- a base over which a workpiece is to be placed;
- a main body including a rotary blade, the main body being provided above the base in such a manner that the main body is movable upward and downward; and
- a guide fence according to claim 1, the guide fence being mountable to the base.

10. A cutting machine comprising:

- a base over which a workpiece is to be placed;
- a main body including a rotary blade, the main body being provided above the base in such a manner that the main body is movable upward and downward; and
- a guide fence according to claim 2, the guide fence being mountable to the base.

11. A cutting machine comprising:

- a base over which a workpiece is to be placed;
- a main body including a rotary blade, the main body being provided above the base in such a manner that the main body is movable upward and downward; and a guide fence according to claim 3, the guide fence being mountable to the base.

12. A cutting machine comprising:

a base over which a workpiece is to be placed;

a main body including a rotary blade, the main body being provided above the base in such a manner that the main body is movable upward and downward; and a guide fence according to claim 4, the guide fence being mountable to the base.

13. A cutting machine comprising:

a base over which a workpiece is to be placed;

a main body including a rotary blade, the main body being provided above the base in such a manner that the main body is movable upward and downward; and a guide fence according to claim 5, the guide fence being mountable to the base.

14. A cutting machine comprising:

a base over which a workpiece is to be placed;

a main body including a rotary blade, the main body being provided above the base in such a manner that the main body is movable upward and downward; and a guide fence according to claim 6, the guide fence being mountable to the base.

15. A cutting machine comprising:

a base over which a workpiece is to be placed;

a main body including a rotary blade, the main body being provided above the base in such a manner that the main body is movable upward and downward; and a guide fence according to claim 7, the guide fence being mountable to the base.

16. A cutting machine comprising:

a base over which a workpiece is to be placed;

a main body including a rotary blade, the main body being provided above the base in such a manner that the main body is movable upward and downward; and a guide fence according to claim 8, the guide fence being mountable to the base.

17. The cutting machine according to claim 9, further comprising:

a round turntable provided substantially at a center of the base in such a manner that the turntable is configured to rotate horizontally, wherein the guide fence is configured to cross over the turntable laterally and is kept out of contact with the turntable.

* * * * *